(12) United States Patent
Shimada

(10) Patent No.: US 7,391,631 B2
(45) Date of Patent: Jun. 24, 2008

(54) SWITCHING POWER SOURCE DEVICE

(75) Inventor: Masaaki Shimada, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 113 days.

(21) Appl. No.: 11/375,777

(22) Filed: Mar. 14, 2006

(65) Prior Publication Data
US 2006/0208789 A1 Sep. 21, 2006

(30) Foreign Application Priority Data
Mar. 15, 2005 (JP) ............... 2005-072689

(51) Int. Cl.
H02M 7/68 (2006.01)
(52) U.S. Cl. ............ 363/89; 323/283; 323/288; 363/79
(58) Field of Classification Search ............ 363/74, 363/75, 79, 80, 81, 82, 52, 53, 59, 60, 61, 363/84, 89, 90, 91, 125, 123, 124, 37, 47, 363/78; 323/271, 222, 283, 288
See application file for complete search history.

(56) References Cited
U.S. PATENT DOCUMENTS

| 5,818,207 | A | * | 10/1998 | Hwang | 323/288 |
| 5,818,707 | A | * | 10/1998 | Seong et al. | 363/89 |
| 6,069,807 | A | * | 5/2000 | Boylan et al. | 363/97 |
| 6,150,771 | A | * | 11/2000 | Perry | 315/291 |
| 6,373,735 | B2 | | 4/2002 | Usui | |
| 6,507,167 | B2 | * | 1/2003 | Han et al. | 318/729 |
| 6,842,353 | B2 | * | 1/2005 | Yamada et al. | 363/89 |
| 6,882,551 | B2 | * | 4/2005 | Shimada et al. | 363/79 |
| 6,984,963 | B2 | * | 1/2006 | Pidutti et al. | 323/207 |
| 7,031,173 | B2 | * | 4/2006 | Feldtkeller | 363/89 |
| 2003/0227279 | A1 | * | 12/2003 | Feldtkeller | 323/222 |
| 2004/0095101 | A1 | * | 5/2004 | Pidutti et al. | 323/222 |
| 2005/0207193 | A1 | * | 9/2005 | Adragna | 363/89 |

* cited by examiner

Primary Examiner—Jeffrey Sterrett
Assistant Examiner—Stuart Hansen
(74) Attorney, Agent, or Firm—Bachman & LaPointe, P.C.

(57) ABSTRACT

A switching power source device is provided which comprises a drive controller 40 connected between an error amplifier 26 and changeover circuit 37. A second comparator 52 of drive controller 40 compares an output voltage or an equivalent signal thereto from error amplifier 26 with a numerical value from a sweep circuit 57 and produces an output to changeover circuit 37 to stop the on-operation of a switching element 4 and restrict an undesirable rise in output voltage during the light load period when the numerical value exceeds the output voltage or an equivalent signal thereto from error amplifier 26.

3 Claims, 5 Drawing Sheets

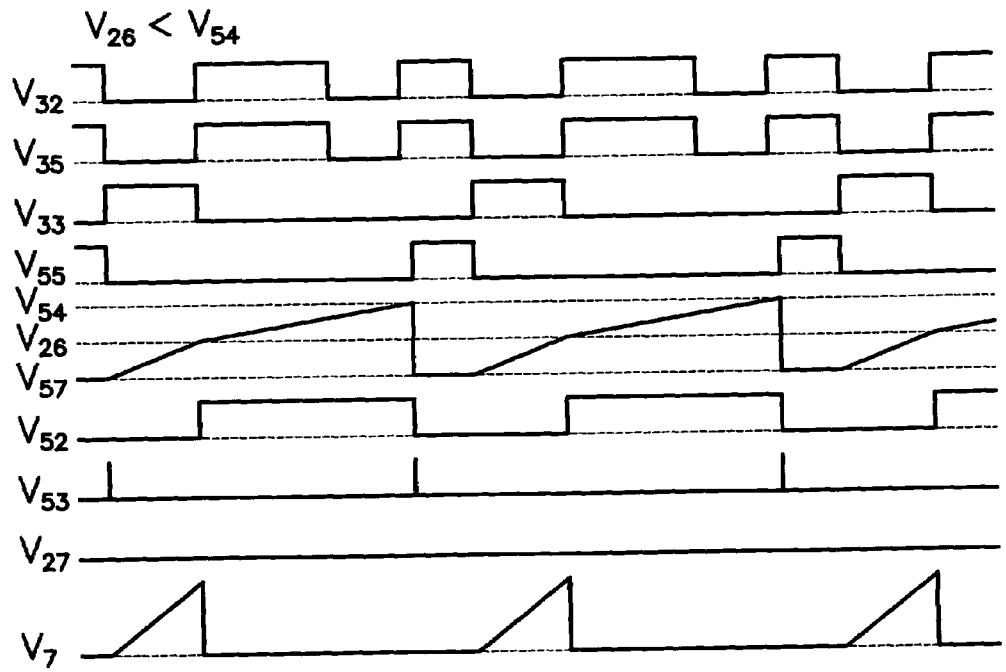
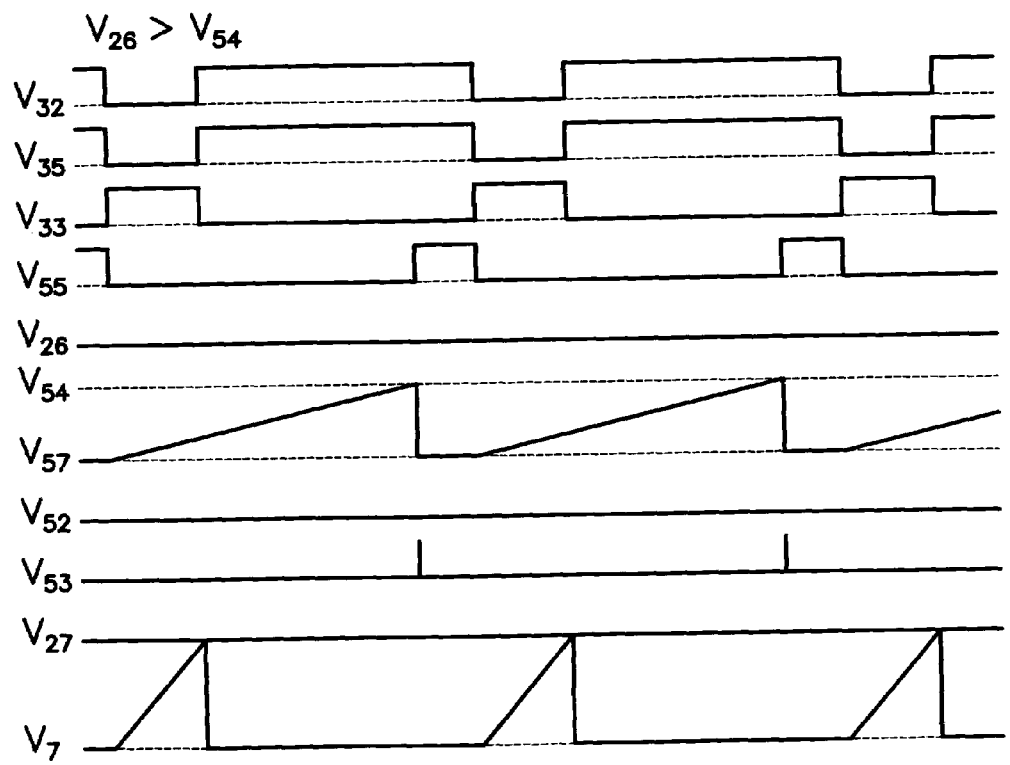

PRIOR ART

SWITCHING POWER SOURCE DEVICE

TECHNICAL FIELD

This invention relates to a switching power source device used in electronics, in particular, a switching power source device which has an improved power factor and enhanced conversion efficiency in electric power during the light load period under control of excessive output voltage.

BACKGROUND OF THE INVENTION

Switching power source devices of improved power factor have been employed in electronics such as office automation facilities and consumer appliances under harmonic current regulations (IEC/EN61000-3-2) and a guideline of harmonics control for household and general electric appliances. For example, U.S. Pat. No. 6,373,735 to Hiroshi Usui, discloses an AC-DC converter which comprises a MOS-FET, a boost circuit having a reactor connected in series to the MOS-FET to produce DC output voltage, and a control circuit for applying drive signals to a gate terminal of the MOS-FET to turn the MOS-FET on and off in order to accumulate and discharge energy in the reactor and produce higher DC output voltage from the reactor than AC voltage applied from AC power source.

FIG. 8 illustrates an example of prior art switching power source devices conforming to harmonic current regulations. The switching power source device of FIG. 8 comprises an AC power source 1; a diode bridge 2 as a rectifying circuit for converting AC input from AC power source 1 into DC power; a series circuit connected between positive and negative terminals of diode bridge 2, the series circuit including a main winding 31 of a boost reactor 3, a MOS-FET 4 as a switching element and a current detector 7 for detecting electric current flowing through the series circuit; a rectifying smoother 5 connected between a junction of main winding 31 of boost reactor 3 and MOS-FET 4 and negative terminal of diode bridge 2; a DC-DC converter 8 having a flyback converter circuit connected to an output side of rectifying smoother 5; an electric load 9 connected to an output side of DC-DC converter 8; and a control circuit 10 for controlling the on-off operation of MOS-FET 4. Rectifying smoother 5 comprises a rectifying diode 15 connected between a junction of main winding 31 of boost reactor 3 and MOS-FET 4 and negative terminal of diode bridge 2; and a smoothing capacitor 16 connected between rectifying diode 15 and negative terminal of diode bridge 2 to connect DC-DC converter 8 in parallel to smoothing capacitor 16. A power factor perfecting circuit is composed mainly of diode bridge 2 and boost reactor 3 to achieve the power factor improvement by performing the switching operation of MOS-FET 4 such that output voltage becomes constant, simultaneously forcing input current into boost chopper in boost reactor 3 to follow input voltage of sine waveform. DC-DC converter 8 connected to a subsequent stage of the power factor perfecting circuit serves to provide an electrically insulated desired output voltage.

Control circuit 10 comprises a pair of dividing resistors 21 and 22 for splitting output voltage from rectifying diode 15 into two voltages; a first normal power supply 25 for generating a first reference voltage; an error amplifier 26 for comparing voltage on a junction 29 between dividing resistors 21 and 22 with first reference voltage to produce an output; a capacitor 28 connected between output terminal of error amplifier 26 and ground; a pair of input dividing resistors 23 and 24 for parting output voltage from diode bridge 2; a multiplier 27 for producing an output of a value proportional to a product of voltage values on a junction 30 between dividing resistors 23 and on output terminal of error amplifier 26; a first comparator 36 for comparing voltage applied on a current detecting resistor 7 as a current detector with the output from multiplier 27 to produce an output when voltage from current detecting resistor 7 is higher than voltage from multiplier 27; an RS-flip flop (RSF/F) 37 as a changeover circuit which is set upon receiving an output from first comparator 36 to produce an output of high voltage level; a second power supply 34 for producing a second reference voltage; a second comparator 35 for comparing voltage induced on an auxiliary winding 32 of boost reactor 3 with second reference voltage to produce an output for resetting RSF/F 37; and a NOR gate 33 for producing an output to gate terminal of MOS-FET 4 when RSF/F 37 is reset. A shunted output of second comparator 35 is supplied directly to gate terminal of MOS-FET 4 through NOR gate 33 and drive resistor 38. The output value from multiplier 27 is set to a value proportional to a product of an instantaneous value from input voltage and error voltage from error amplifier 26. Terminal voltage from current detecting resistor 7 to non-inverted input terminal of first comparator 36 is similar or analogous to a waveform of electric current flowing through MOS-FET 4.

In operation, a drive signal is applied to gate terminal of MOS-FET 4 which is then turned on to start flowing of excitation current from AC power source 1 through diode bridge 2, main winding of boost reactor 3, MOS-FET 4 and current detecting resistor 7 to diode bridge 2 so that excitation current linearly increases to accumulate energy in boost reactor 3. At this point, rectified pulsating voltage is applied to main winding 31 of boost reactor 3 from diode bridge 2, and no current flows through rectifying diode 15 to which voltage in the adverse direction is applied.

Increasing excitation current flows through MOS-FET 4 and is detected by current detecting resistor 7 as a voltage of the level corresponding to the amount of excitation current to supply detected voltage to first comparator 36. Error amplifier 26 compares voltage on junction 29 between resistors 21 and 22 with first reference voltage of first power supply 25 to produce output when voltage on junction 29 is higher than first reference voltage. Multiplier 27 performs multiplication of input voltage from junction 30 and output from error amplifier 26 to give the product to first comparator 36 which compares output from current detecting resistor 7 with the product from multiplier 27. When excitation current increases so that output from current detecting resistor 7 is elevated above the output from multiplier 27, first comparator 36 produces the output of high voltage level to set RSF/F 37 which then issues the output to switch MOS-FET 4 from the on or conductive condition to the off or non-conductive condition.

Energy stored in boost reactor 3 during the on period of MOS-FET 4, causes electric current to flow through rectifying diode 15, smoothing capacitor 16 and DC-DC converter 8 to load 9 when MOS-FET 4 is turned off. At this moment, voltage polarity of auxiliary winding 32 in boost reactor 3 is inverted, and energy accumulated in boost reactor 3 increases and produces rising voltage on auxiliary winding 32. When voltage on auxiliary winding 32 becomes higher than second reference voltage of second power supply 34 applied on inverted input terminal of second comparator 35, it changes the output to high voltage level to reset RSF/F 37 and make MOS-FET 4 retain in the off condition through NOR gate 33 and drive resistor 38. MOS-FET 4 keeps its off condition until excitation current flowing through main winding 31 of boost reactor 3 comes to zero. When stored energy in boost reactor 3 is completely discharged, the voltage polarity in auxiliary winding 32 is inverted to cause second comparator 35 to change the output to the low voltage level so that MOS-FET 4 is turned on to resume a next switching cycle. In the switching power source device shown in FIG. 8, adjustment of the on-span of MOS-FET 4 can modulate energy amount accumulated in boost reactor 3. Also, power factor in the switching power source device can be improved by controlling excitation current running through MOS-FET 4 so as to approximate excitation current to similar figure in waveform of input sine waveform with the greatest possible accuracy, and at the same time, controlling the on-time of MOS-FET 4 so as to stabilize output voltage from rectifying smoother 5 to a constant level.

Input signal rectified through diode bridge 2 is branched by dividing resistors 23 and 24 into multiplier 27 as having the wave profile similar to fully rectified voltage waveform. On the other hand, error amplifier 26 produces the error signal or differential between DC output voltage separated by dividing resistors 21 and 22 and first reference voltage of first power supply 25, and output from error amplifier 26 is given to multiplier 27 which multiplies the output from error amplifier 26 by DC input voltage similar to rectified sine waveform to provide a command for setting an aimed value of electric current through MOS-FET 4. Accordingly, power factor can be improved by holding a critical or transitional performance or approximating electric current flowing through source and drain terminals of MOS-FET 4 from zero to peak voltage of AC power source 1 to similar figure in waveform of the aimed value of electric current sine waveform with the greatest possible accuracy so that electric current flowing through source and drain terminals of MOS-FET 4 is formed into a similar waveform to that of input sine wave voltage with the same phase.

In view of a fact that prior art switching power source device shown in FIG. 8 increases switching frequency of operating MOS-FET 4 during the light load period, elevated switching frequency may produce a disadvantageous delay in response of control circuit 10 or MOS-FET 4. If this is the case, control circuit 10 cannot shorten the drive signal for MOS-FET 4 to an optimal on-pulse width, thereby causing output voltage to undesirably rise and excessive voltage to appear on smoothing capacitor 16, expanding a risk of causing breakdown of the power source. Also, it has other drawbacks that increase in switching frequency during the light load period leads step-up in switching loss and amount of generated heat and big reduction in conversion efficiency of electric power. Moreover, drive resistor 38 connected between NOR gate 33 and gate terminal of MOS-FET 4 generates increased amount of heat, and therefore, unfavorably requires its large capacity in electric power.

Accordingly, an object of the present invention is to provide a switching power source device capable of controlling an undesirable rise in output voltage during the light load period.

SUMMARY OF THE INVENTION

The switching power source device according to the present invention, comprises: a rectifier (2) connected to an AC power source (1); a series circuit connected between positive and negative terminals of the rectifier (2), the series circuit including a main winding (31) of a boost reactor (3), a switching element (4) and a current detector (7) for detecting electric current flowing through the series circuit; a rectifying smoother (5) connected between a junction of the main winding (31) of the boost reactor (3) and switching element (4) and negative terminal of the rectifier (2); and a control circuit (10) for controlling the on-off operation of the switching element (4) in response to voltage induced on an auxiliary winding (32) of the boost reactor (3) to produce a DC output from the rectifying smoother (5). The control circuit (10) comprises an error amplifier (26) for producing an error voltage between DC voltage from the rectifying smoother (5) and a first reference voltage from a first normal power supply (25); a multiplier (27) for producing a product of the error voltage from the error amplifier (26) and pulsating voltage generated at the positive terminal of the rectifier (2); a first comparator (36) for comparing output from the multiplier (27) with a value of electric current flowing through the switching element (4); and a changeover circuit (37) for turning the switching element (4) off upon receiving an output from the first comparator (36). Connected between the error amplifier (26) and changeover circuit (37) is a drive controller (40) which comprises a sweep circuit (57) for increasing or decreasing a numerical value; a reset circuit (50) for making the sweep circuit (57) start increasing the numerical value upon producing a drive signal to the switching element (4); and a second comparator (52) for comparing an output voltage or an equivalent signal thereto from the error amplifier (26) with the numerical value from the sweep circuit (57) and producing an output to changeover circuit (37) to stop the on-operation of the switching element (4) when the numerical value exceeds the output voltage or an equivalent signal thereto from the error amplifier (26).

During the light load period, second comparator (52) compares error output from error amplifier (26) with the numerical value from sweep circuit (57) to produce the output from second comparator (52) when the numerical value exceeds a level of the output from error amplifier (26) so that the output from second comparator (52) serves to stop the on action of the switching element (4) to restrict an undesirable rise in output voltage. Consequently, the device can control, reduce or minimize all harmful effects such as excessive voltage applied on smoothing capacitor (16) and malfunction resulted therefrom, increase in switching loss and generated heat associated with rise in switching frequency of the switching element (4), declination in conversion efficiency of electric power, and evolution of heat from drive resistor (38).

BRIEF DESCRIPTION OF THE DRAWINGS

The above-mentioned and other objects and advantages of the present invention will be apparent from the following description in connection with preferred embodiments shown in the accompanying drawings wherein:

FIG. 4 is a time chart of voltages in locations selected in the drive controller in the active condition;

FIG. 5 is a time chart of voltages in locations selected in the drive controller in the inactive condition;

BEST MODE FOR CARRYING OUT THE INVENTION

Figure 7:
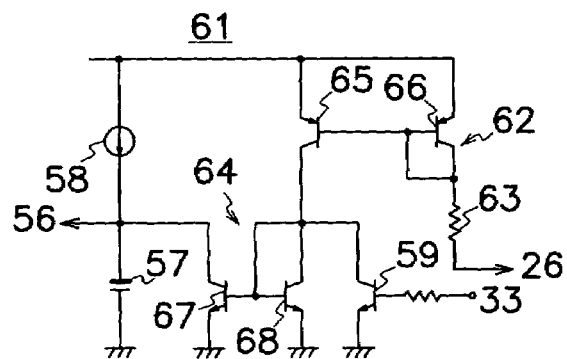
FIG. 7 is an electric circuit diagram showing an embodiment of the current regulator shown in FIG. 6.
Figure 8:
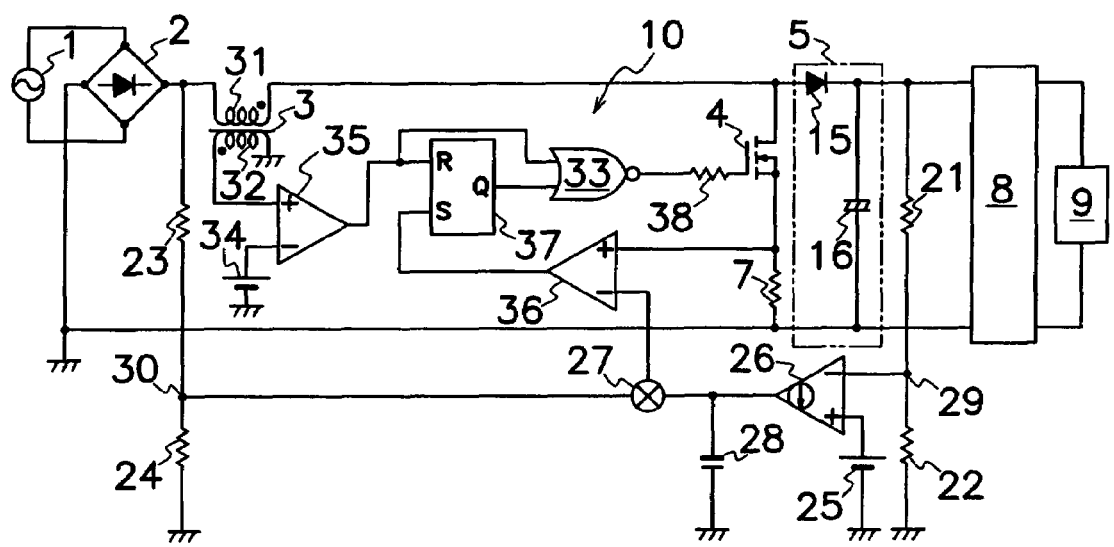
FIG. 8 is an electric circuit diagram showing a prior art switching power source device.

Embodiments of the switching power source device according to the present invention will be described hereinafter in connection with FIGS. 1 to 7 of the drawings. Same reference symbols as those shown in FIG. 8 are applied to similar portions in FIGS. 1 to 7, omitting explanation thereon.

Figure 1:
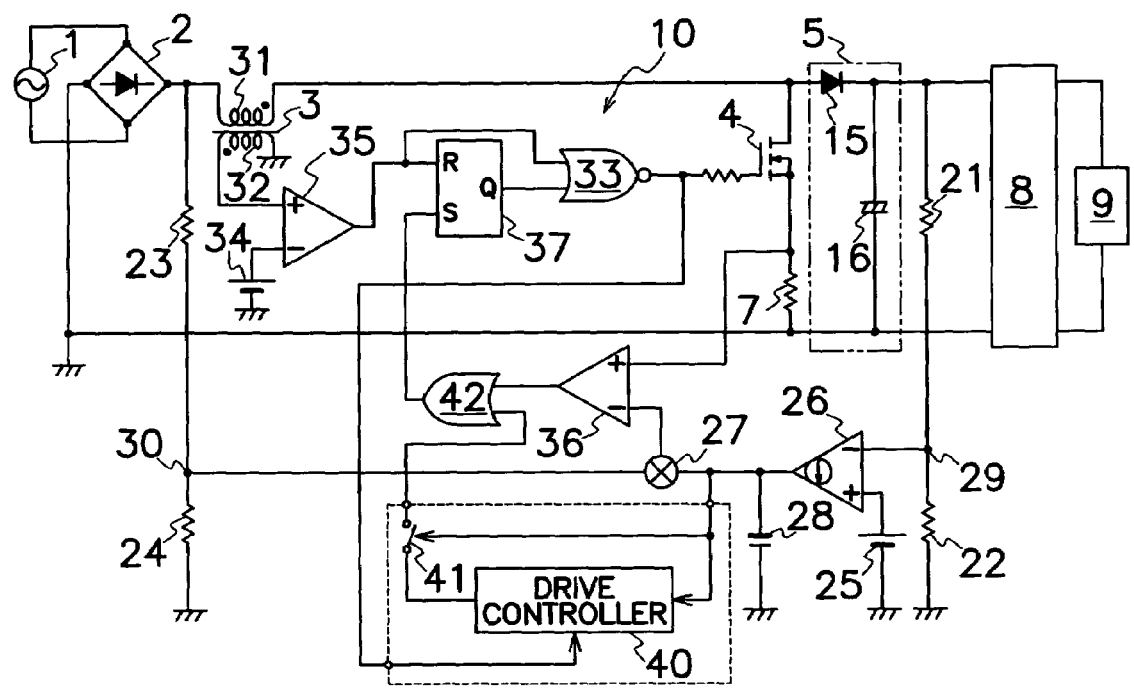
FIG. 1 is an electric circuit diagram of a switching power source device according to the present invention.
Figure 2:
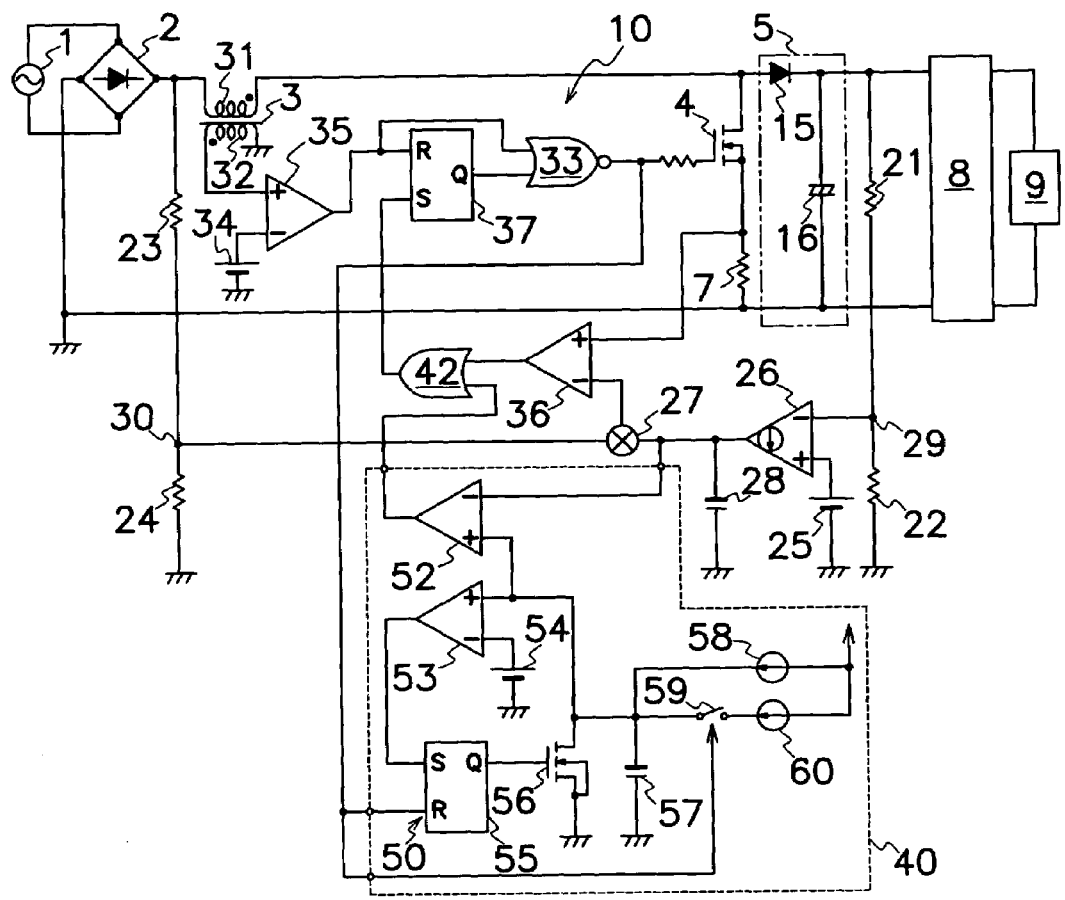
FIG. 2 is an electric circuit diagram showing a first embodiment of a drive controller shown in FIG. 1.

FIG. 1 is an electric circuit diagram showing the basic concept of the switching power source device according to the present invention. As shown in FIG. 1, the switching power source device according to the present invention, comprises: an OR gate 42 connected between first comparator 36 and RSF/F 37 as a changeover circuit; a drive controller 40 connected in series between a junction of error amplifier 26 and multiplier 27 and OR gate 42 for receiving drive signals to MOS-FET 4; and a switch element 41 connected between an output terminal of drive controller 40 and OR gate 42. FIG. 2 is an electric circuit diagram of a first embodiment of drive controller 40.

In the first embodiment shown in FIG. 2, drive controller 40 comprises a second comparator 52 which has an inverted input terminal connected to junction of error amplifier 26 and multiplier 27 and an output terminal connected to an input terminal of OR gate 42; a level detector 53 which has an inverted input terminal connected to a second normal power supply 54 for producing a second reference voltage to inverted input terminal of level detector 53; a MOS-FET 56 as switch element 41 which has a drain terminal (one main terminal) connected to each inverted input terminal of second comparator 52 and level detector 53, and source terminal (the other main terminal) connected to ground; a control RSF/F 55 which has a set input terminal connected to output terminal of level detector 53 and an output terminal connected to a gate (control) terminal of MOS-FET 56; a capacitor 57 as a sweep circuit connected in parallel to MOS-FET 56; a first current regulator 58 for supplying electric current to capacitor 57; and a switch 59 and a second current regulator 60 connected in parallel to first current regulator 58. Level detector 53, second normal power supply 54, control RSF/F 55 and MOS-FET 56 constitutes a reset circuit 50 for determining a discharge time of capacitor 57. Inverted and non-inverted input terminals of second comparator 52 are connected respectively to output terminal of error amplifier 26 and capacitor 57.

Reset circuit 50 comprises control RSF/F 55 as a changeover element for producing a first output of low voltage level when RSF/F 55 receives at the reset terminal a drive signal for gate terminal of MOS-FET 4, but otherwise producing a second output of high voltage level when RSF/F 55 receives at the set terminal an output from level detector 53; and MOS-FET 56 as a switch element which is turned off and on when MOS-FET 56 receives at the gate terminal respectively first and second output signals from control RSF/F 55. Capacitor 57 is electrically charged and discharged when MOS-FET 56 is respectively turned off and on.

Second comparator 52 of FIG. 2 is named differently from switch 41 of FIG. 1, but these are similar elements of performing the same function for generating an output from drive controller in response to output level from error amplifier 26. Output terminal of NOR gate 33 is connected to reset terminal of control RSF/F 55 and also switch 59. Switch 59 is turned on upon receiving a drive signal of high voltage level from NOR gate 33 to supply electric current from second current regulator 60, but turned off upon receiving a drive signal of low voltage level from NOR gate 33.

During the steady operation wherein error amplifier 26 issues the output of high voltage level, each time NOR gate 33 provides the drive signal of high voltage level for gate terminal of MOS-FET 4, MOS-FET 4 is turned on, and at the same time, RSF/F 55 is reset, switch 59 is turned on and MOS-FET 56 is turned off. Accordingly, capacitor 57 is charged with composite current merged from electric currents flowing through first and second current regulators 58 and 60. When charged voltage in capacitor 57 exceeds second reference voltage of second normal power supply 54, level detector 53 produces the output to set RSF/F 55 which is then turned on to discharge capacitor 57. Thus, during the steady operation, the on and off switching of MOS-FET 56 causes repetitious charge and discharge of capacitor 57, however, second comparator does not produce the output without operation by drive controller 40 because error amplifier 26 produces the output of voltage $V_{26}$ higher than voltage $V_{57}$ on capacitor 57 as shown in FIG. 5.

During the light load period, error amplifier 26 produces the output of low voltage level, and when OR gate 33 produces the drive signal of high voltage level, MOS-FET 4 is turned on, and at the same time, RSF/F 55 receives at the reset terminal the drive signal from OR gate 33 to reset RSF/F 55, and switch 59 is turned on. Then, capacitor 57 is charged by composite current from first and second current regulators 58 and 60 to raise charged voltage $V_{57}$ in capacitor 57. However, as error amplifier 26 produces the output of low voltage level during the light load period, when charged voltage $V_{57}$ in capacitor 57 exceeds output voltage $V_{26}$ from error amplifier 26, second comparator 52 produces the output of high voltage level because second comparator 52 receives charged voltage $V_{57}$ in capacitor 57 at the non-inverted input terminal. Therefore, RSF/F 37 is set to produce the output of high voltage level to NOR gate 33 which changes the output signal to low voltage level to turn MOS-FET 4 off. Simultaneously, switch 59 is also turned off, capacitor 57 is charged by electric current flowing only through first current regulator 58 for delayed charging at slower rate. In this way, capacitor 57 can be charged at lower electrifying rate for delayed resumption time of turning MOS-FET 4 on from the off condition.

When charged voltage $V_{57}$ in capacitor 57 increases above second reference voltage $V_{54}$ of second power supply 54, level detector 53 produces the output of high voltage level to set RSF/F 55. Accordingly, RSF/F 55 produces the output of high voltage level to turn MOS-FET 56 on to discharge capacitor 57 so that second comparator 52 changes the output from high to low voltage level. Under the condition, when polarity voltage on auxiliary winding 32 is inverted to switch output from second comparator 35 from high to low voltage level, MOS-FET 4 is turned on. In this way, when error amplifier 26 produces the output of low voltage level during the light load period, second comparator 52 of drive controller 40 produces the output to shift RSF/F 37 to the set condition and maintain the same in the set condition until capacitor 57 is charged to a voltage level above second reference voltage $V_{54}$ of second power supply 54. During the extended set period of RSF/F 37, MOS-FET 4 is kept in the off condition.

Figure 3:
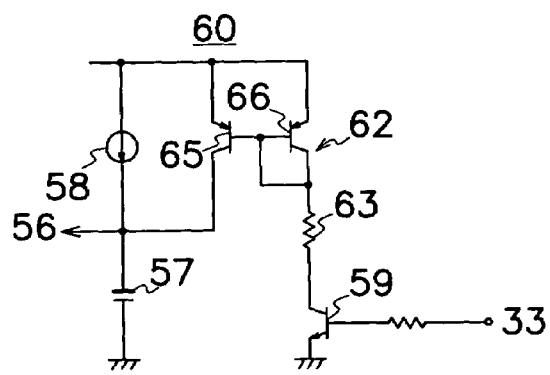
FIG. 3 is an electric circuit diagram showing an embodiment of a current regulator shown in FIG. 2.

FIG. 3 is an electric circuit diagram showing a practical embodiment of second current regulator 60 which comprises a current mirror circuit 62 including a pair of bipolar transistors 65 and 66 connected to a power supply not shown and in parallel to first current regulator 58; a bipolar transistor 59 as a switch; and a resistor 63 connected between collector terminals of bipolar transistors 66 and 59. Under the inherent property of current mirror circuit 62, two electric currents of substantially identical level with each other flows through bipolar transistor 65 to capacitor 57 to charge capacitor 57 and through bipolar transistors 66 and 59.

Figure 6:
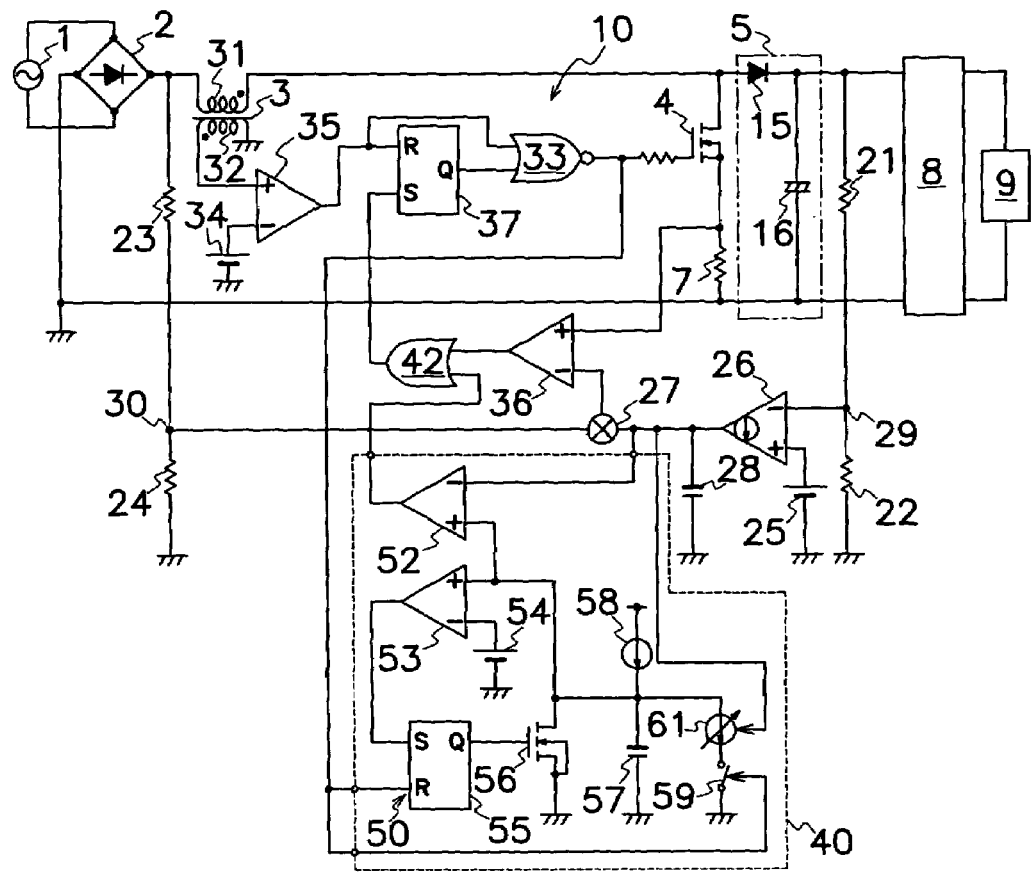
FIG. 6 is an electric circuit diagram showing a second embodiment of the drive controller shown in FIG. 1

FIG. 6 shows a second embodiment of the drive controller in the switching power source according to the present invention wherein a regulatory series circuit of variable current regulator 61 and bipolar transistor 59 as a switch is connected in parallel to capacitor 57 to electrically charge capacitor 57 with a differential current between those flowing through first current regulator 58 and variable current regulator 61 unlike the drive controller shown in FIG. 2. FIG. 7 illustrates a detailed circuit of the drive controller shown in FIG. 6. However, whereas bipolar transistor 59 of FIG. 6 is turned off when NOR gate 33 produces the output of high voltage level, bipolar transistor 59 of FIG. 7 is turned on when NOR gate 33 produces the output of high voltage level. In either of circuits shown in FIGS. 6 and 7, no current flows from current regulator 61 while NOR gate 33 produces the output of high voltage level. Variable current regulator 61 of FIG. 7 comprises a first current mirror circuit 61 which has a pair of transistors 65 and 66 both connected to a power supply; and a second current mirror circuit 64 which has a pair of transistors 67 and 68 to cause electric current output from first current mirror circuit 61 to flow through second current mirror circuit 64. Collector terminal of transistor 66 is connected to output terminal of error amplifier 26 through resistor 63 to form an input terminal for current setting of first current mirror circuit 62. Collector and emitter terminals of transistor 67 are connected in parallel to capacitor 57 to form an output terminal for current through second current mirror circuit 64. Also, collector and emitter terminals of transistor 59 are connected in parallel to collector and emitter terminals of transistor 68 and to input terminal of second current mirror circuit 64 so that transistor 59 serves as a switch for turning variable current regulator 61 on and off.

During the light load period wherein voltage in capacitor 57 is higher than output voltage from error amplifier 26, transistor or switch 59 is turned on to inhibit operation of variable current regulator 61, while charging capacitor 57 with electric current through first current regulator 58. When MOS-FET 4 is turned off, simultaneously turning switch 59 off, variable current regulator 61 is driven to branch a part of electric current from first current regulator 58 into a diverted flow through transistor 67 so that capacitor 57 is charged at a slow electrifying rate with only a part of electric current from first current regulator 58 because the remainder is deducted from electric current from first current regulator 58 and diverted into second current mirror circuit 64.

Thus, the timing for turning variable current regulator 61 on and off is determined by switch transistor 59 which has collector and emitter terminals in parallel to collector and emitter terminals of transistor 68 for an input terminal of second current mirror circuit 64. During the light load period, output voltage from error amplifier 26 becomes lower, and with the lower output voltage from error amplifier 26, the higher voltage is applied on resistor 63, in other words, with the lighter load, more amount of electric current flows through resistor 63. Concurrently, the more amount of electric current flows through first and second current mirror circuits 62 and 64, and adversely, the less amount of charging electric current flows into capacitor 57. This means that with the lighter load during the light load period, charging rate for capacitor 57 becomes slower to more extend the off-time of MOS-FET 4. To the contrary, when output voltage from error amplifier 26 becomes lower during the light load period, second comparator 52 serves to shorten the on-time of MOS-FET 4 because charged voltage in capacitor 57 early exceeds output voltage from error amplifier 26.

When service operation of the switching power source device shown in FIG. 6, moves from the steady condition to the light load condition, error amplifier 26 produces the output of low voltage level, NOR gate 33 forwards drive signal of high voltage level to gate terminal of MOS-FET 4 to turn MOS-FET 4 on and also to reset terminal of RSF/F 55 to turn MOS-FET 56 off. Accordingly, capacitor 57 is charged with electric current from first current regulator 58 while keeping switch 59 in the off condition. Once charged voltage $V_{57}$ in capacitor 57 is elevated above output voltage $V_{26}$ from error amplifier 26 as shown in FIG. 4, second comparator 52 produces the output of high voltage level because charged voltage $V_{57}$ on non-inverted input terminal of second comparator 52 is higher than output voltage $V_{26}$ from error amplifier 26. Consequently, RSF/F 37 is set to produce the output of high voltage level so that NOR gate 33 develops the output of low voltage level to turn MOS-FET 4 off. As a part of operations in first embodiment shown in FIG. 6 is different from that in second embodiment shown in FIG. 2, switch 59 is turned off when drive signal of high voltage level is given to gate terminal of MOS-FET 4. With abeyance of variable current regulator 61, capacitor 57 is charged with electric current from first current regulator 58. When drive signal to MOS-FET 4 is switched to low voltage level, switch 59 is changed to on to activate variable current regulator 61. In this case, assuming that current amount $I_{58}$ through first current regulator 58 is greater than current amount 161 through variable current regulator 61 ($I_{58}>I_{61}$), capacitor 57 is charged with slow electrifying rate with differential current between those running through first and variable current regulators 58 and 61.

When capacitor 57 is charged to high voltage $V_{57}$ over reference voltage $V_{54}$ of second power supply 54, level detector 53 produces the output of high voltage level to set RSF/F 55 which then produces the output of high voltage level to turn MOS-FET 56 on and discharge capacitor 57 by releasing electric current from capacitor 57 through MOS-FET 56. Therefore, second comparator 52 changes the output from high to low voltage level. Under the condition, when polarity of auxiliary winding 32 is inverted, second comparator 35 changes the output from high to low voltage level to turn MOS-FET 4 on. This causes error amplifier 26 to generate the output of low voltage level to shorten the on period of MOS-FET 4 and concomitantly extend the off period of MOS-FET 4. Variable current regulator 61 has the characteristics of increasing a constant value of running current as output voltage from error amplifier 26 becomes low. If output voltage from error amplifier 26 drops beneath second reference voltage of second power supply 54, charged voltage of capacitor 57 is higher than output voltage from error amplifier 26, second comparator 52 produces the output to RSF/F 37. With the higher voltage of output from error amplifier 26 during the steady operation, the period of time for producing the output of low voltage level from control RSF/F 55 can be more reduced or kept constant to lower the output voltage from rectifying smoother 5, and to the contrary, with the lower voltage of output from error amplifier 26 during the light load operation, the period of time for producing the output of low voltage level from control RSF/F 55 can be more extended.

The above-mentioned embodiments according to the present invention may be further modified in various ways without limitation to the foregoing embodiments. In lieu of holding the critical or transitional performance as above-mentioned, power factor can be improved of boost reactor 3 by discontinuous performance for making reactor current discontinuous or continuous performance for making reactor current continuous. Also, in place of flyback converter, DC-DC converter 8 may include an RCC (Ringing Choke Converter) circuit, forward converter circuit, half-bridge circuit and bridge circuit and the like. Current mirror circuits may be composed by current control elements other than bipolar transistor such as MOS-FET. Switching element 4 may comprise field effect transistor, bipolar transistor or switch of the type other than MOS-FET.

Second embodiment of drive controller 40 comprises two current regulators 58 and 60 for supplying electric current to capacitor 57 as a sweep circuit to produce two increasing ramps of charged voltage in capacitor 57. Second comparator 52 compares charged voltage with output voltage from error amplifier 26, and level detector 53 compares charged voltage with second reference voltage of second power supply 54 both in analog fashions to interrupt drive signal to MOS-FET 4, change the ramp and reset sweep circuit as a result of the analog comparison. Otherwise, in place of combination of capacitor as a sweep circuit and current regulators, digital comparison may be used by counting digital signals in a digital circuit of counter or microcomputer, digitally counting output voltage from error amplifier 26 and comparing the digitally counted value with counted digital number and a certain value in a digital comparator. To vary ramps, clock frequency may be modulated for counter, different clock pulses may be used for micro-computer, or a step value of counting-up may be changed. Adoption of half clock or half step may result in half ramp with gentle slope.

In the present invention, the control circuit forms an arrangement for improving power factor by reducing the on-time width of the switching element, in other words, extending the off-time width of the switching element during the light load period to inhibit an undesirable rise in output voltage and prevent undesirable elevation in voltage on output capacitor. Shortened on-time width can lead the switching element to the reduced switching frequency, attenuating noise resulted from magnetic strain of the boost reactor. Moreover, reduction in switching frequency can advantageously result in diminution in switching loss, prevention of heat generation from switching element and drive resistor, and improvement in conversion efficiency of electric power during the light load period. Also, the device can afford to use a drive resistor of low capacity in electric power to provide an inexpensive switching power source device. The present invention is applicable to all switching power source devices which contemplate improvement in conversion efficiency of electric power and control of excessive output voltage.

What is claimed is:

1. A switching power source device comprising:
a rectifier connected to an AC power source;
a series circuit connected between positive and negative terminals of said rectifier, said series circuit including a main winding of a boost reactor, a switching element and a current detector for detecting electric current flowing through said series circuit;
a rectifying smoother connected between a junction of said main winding of the boost reactor and switching element and negative terminal of said rectifier; and
a control circuit for controlling the on-off operation of said switching element in response to voltage induced on an auxiliary winding of the boost reactor to produce a DC output from said rectifying smoother;
said control circuit comprising an error amplifier for producing an error voltage between DC voltage from the rectifying smoother and a first reference voltage from a first normal power supply; a multiplier for producing a product of the error voltage from the error amplifier and pulsating voltage generated at the positive terminal of the rectifier; a first comparator for comparing output from the multiplier with a value of electric current flowing through the switching element; and a changeover circuit for turning the switching element off upon receiving an output from the first comparator, and
a drive controller connected between the error amplifier and changeover circuit, said drive controller comprising a sweep circuit for producing an increased or decreased voltage; a reset circuit for making the sweep circuit start sweeping the voltage upon producing a drive signal to the switching element; and a second comparator for comparing an output voltage from the error amplifier with the voltage from the sweep circuit and producing an output to changeover circuit to stop the on-operation of the switching element when the voltage exceeds the output voltage from the error amplifier;
wherein said drive controller comprises a second normal power supply for producing a second reference voltage, and a level detector having a first input terminal connected to said second normal power supply and a secondinput terminal connected to the sweep circuit for producing the output when the voltage in said sweep circuit reaches the second reference voltage; and;
said reset circuit resets the voltage in the sweep circuit in response to an output from said level detector.

2. The switching power source device of claim 1, wherein said drive controller comprises a variable ramp voltage generator controlled by drive signals for said switching element;
said sweep circuit starts sweeping the voltage with a first ramp during a first period of time until the voltage reaches the output voltage from the error amplifier when the level of output from said error amplifier is lower than the second reference voltage and also a drive signal is produced to said switching element;
when the voltage of the sweep circuit reaches the output voltage from the error amplifier, the second comparator produces the output to stop the drive signal to said switching element;
when the drive signal to said switching element is stopped, the variable ramp voltage generator sweeps the voltage of said sweep circuit with a smaller second ramp than the first ramp during the second period of time.

3. The switching power source device of claim 2, wherein the first period of time of said sweep circuit becomes constant or shortened with reduction of output voltage of said error amplifier; and
the second period of time becomes extended with reduction of out put voltage of said error amplifier.

* * * * *